United States Patent
Tanihara et al.

(10) Patent No.: US 7,156,379 B2
(45) Date of Patent: Jan. 2, 2007

(54) FUEL CELL-USE HUMIDIFIER

(75) Inventors: Nozomu Tanihara, Ube (JP); Toshimune Yoshinaga, Ichihara (JP)

(73) Assignee: Ube Industries, Ltd. (JP)

( * ) Notice: Subject to any disclaimer, the term of this patent is extended or adjusted under 35 U.S.C. 154(b) by 205 days.

(21) Appl. No.: 10/516,483

(22) PCT Filed: May 28, 2003

(86) PCT No.: PCT/JP03/06711

§ 371 (c)(1), (2), (4) Date: Nov. 30, 2004

(87) PCT Pub. No.: WO2004/004044

PCT Pub. Date: Jan. 8, 2004

(65) Prior Publication Data

US 2005/0221133 A1    Oct. 6, 2005

(30) Foreign Application Priority Data

May 31, 2002    (JP)    .............................. 2002-159891

(51) Int. Cl.
*B01F 3/04*    (2006.01)
(52) U.S. Cl. .............................. 261/102; 261/104; 96/8
(58) Field of Classification Search .................. 261/96, 261/99, 102, 104; 95/52; 96/8, 10
See application file for complete search history.

(56) References Cited

U.S. PATENT DOCUMENTS

| | | | | |
|---|---|---|---|---|
| 5,470,469 A * | 11/1995 | Eckman | .................... | 210/321.8 |
| 5,525,143 A * | 6/1996 | Morgan et al. | ................. | 95/52 |
| 6,210,464 B1 | 4/2001 | Nakanishi et al. | | |
| 6,659,433 B1 * | 12/2003 | Kusano et al. | .............. | 261/102 |
| 6,669,177 B1 * | 12/2003 | Shimanuki et al. | ........... | 261/96 |
| 2001/0015500 A1 | 8/2001 | Shimanuki et al. | | |
| 2001/0021467 A1 | 9/2001 | Suzuki et al. | | |
| 2002/0035922 A1 * | 3/2002 | Nakanishi et al. | ............. | 95/52 |

FOREIGN PATENT DOCUMENTS

EP    1118371 A1    7/2001

(Continued)

*Primary Examiner*—Scott Bushey
(74) *Attorney, Agent, or Firm*—DLA Piper US LLP

(57) ABSTRACT

An object of the present invention is to provide a humidifying apparatus capable of improving the humidification efficiency while lowering the pressure loss of gas even when a low-pressure gas is used, and is suitably usable for fuel cells. The present invention relates to a humidifying apparatus for fuel cells, fabricated by loading a hollow fiber membrane element into a container such that the space communicating with the hollow side of the hollow fiber membranes is isolated from the space communicating with the outer side of the hollow fiber membranes, wherein (a) the inner diameter of the hollow fiber membrane is larger than 400 μm, (b) the water vapor permeation rate ($P'_{H_2O}$) of the hollow fiber membranes is $0.5 \times 10^{-3}$ cm$^3$ (STP)/cm$^2$·sec·cm Hg or more, (c) the ratio ($P'_{H_2O}/P'_{O_2}$) of the water vapor permeation rate to the oxygen gas permeation rate of the hollow fiber membranes is 10 or more, and (d) the elongation at tensile break of the hollow fiber membranes after hot water treatment in hot water at 100° C. for 50 hours is 80% or more of that before the hot water treatment; particularly, the present invention relates to a humidifying apparatus for fuel cells where, if the effective length of the hollow fiber membrane element is L and the inner diameter of the container into which the hollow fiber membrane element is loaded is D, L/D is 1.8 or more.

4 Claims, 2 Drawing Sheets

FOREIGN PATENT DOCUMENTS

| | | |
|---|---|---|
| JP | 63-236517 A | 10/1988 |
| JP | 7-328401 A | 12/1995 |
| JP | 2001-219025 A | 8/2001 |
| JP | 2002-66262 | 3/2002 |
| JP | 2002-117879 A | 4/2002 |

* cited by examiner

FUEL CELL-USE HUMIDIFIER

TECHNICAL FIELD

The present invention relates to a humidifying apparatus, using hollow fiber membranes, which is suitable for humidifying a supply gas of a fuel cell. The humidifying apparatus for fuel cells of the present invention can perform humidification with high efficiency while lowering a pressure loss, can reduce the permeation of components other than water vapor and is economical. Particularly, the humidifying apparatus for fuel cells of the present invention is suitable for recovering the water component from the exhaust gas discharged from a fuel cell and using it for humidifying a supply gas supplied to the fuel cell.

BACKGROUND ART

In recent years, a fuel cell using a solid polymer membrane, such as perfluorocarbonsulfonic acid membrane, for the electrolyte membrane is attracting attention as a power source of electric cars or small stationary power-generating devices. Such solid polymer functions, in the hydrous state, as a proton conductive electrolyte but in the dry state, the proton conductivity decreases and at the same time, contact failure occurs between the solid polymer electrolyte membrane and the electrode to cause an abrupt-decrease in the output. Therefore, in the solid polymer-type fuel cell system, the supply gas is supplied after humidifying it so that the solid polymer electrolyte membrane is kept at a constant humidity. For this purpose, various studies are being made on the humidifying apparatus for humidifying a supply gas.

Japanese Unexamined Patent Publication (Kokai) No. 6-132038 discloses a technique of humidifying a supply gas, where the exhaust gas discharged from a fuel cell is supplied as a humidifying gas to a fuel cell by using a water vapor-permeable membrane.

Kokai No. 8-273687 discloses a technique of humidifying a supply gas of a fuel cell in a humidifying apparatus using hollow fiber membranes.

The humidifying apparatus for fuel cells is required to have capabilities of stably performing the humidification even when exposed for a long time to a temperature of about 80° C., which is an operating temperature of the fuel cell, or in an atmosphere where water vapor, oxygen, hydrogen and the like are present, efficiently performing the humidification even when a low-pressure gas is used, lowering the pressure loss of gas, and reducing the permeation of components other than water vapor.

For example, Kokai No. 2001-351660 proposes to provide auxiliary humidifying means comprising a condenser and a water injection valve, in addition to a hollow fiber water-permeable humidifying apparatus. This is proposed to solve the problem that scale-up made to increase the humidification amount leads to increase of the pressure loss even in a low-pressure operation and therefore, use of a hollow fiber water-permeable membrane-type humidifying apparatus is limited.

This indicates that, the humidifying apparatus for fuel cells using a hollow fiber membrane is still in need of improvements.

U.S. Pat. No. 6,464,755, by several inventors including the present inventors, discloses asymmetric hollow fiber gas separation membranes having a high gas permeation rate and a practical level of mechanical strength and being excellent in both water resistance and hot water resistance, and refers to the possibility that the asymmetric hollow fiber gas separation membranes can be used also for humidifying a supply gas of a fuel cell. However, in U.S. Pat. No. 6,464,755, the parameters useful in applying the hollow fiber gas separation membranes to a humidifier for fuel cells are not specifically studied and disclosed.

Kokai No. 2002-219339 discloses a humidifier module using hollow fiber membranes, where when the ratio L/A of the shortest length L drawn in the region filled with a hollow fiber membrane bundle to the length A of a diagonal line drawn in that region or the ratio D/L of the height D of a hollow fiber membrane bundle in a region filled with a hollow fiber membrane bundle to the shortest length L drawn in that region is in a specific range and a dry gas can be uniformly spread over an outer surface of each hollow fiber membrane in a cylindrical housing, so that the humidification ability of the humidifier can be enhanced. However, unlike the present invention, Kokai No. 2002-219339 is not an invention disclosing a method for solving the problem regarding the pressure loss of the hollow fiber membranes in the humidifier module.

An object of the present invention is to provide a humidifying apparatus which can stably perform the humidification even when exposed for a long time to a temperature of about 80° C., which is an operating temperature of a fuel cell, or in an atmosphere where water vapor, oxygen, hydrogen and the like are present, can elevate the humidification efficiency while lowering the pressure loss of gas even when a low-pressure gas is used, can reduce the permeation of components other than water vapor, is economical and can be suitably used for a fuel cell.

DISCLOSURE OF THE INVENTION

The present invention relates to a humidifying apparatus for fuel cells, comprising a hollow fiber membrane element in which a hollow fiber membrane bundle, comprising a large number of hollow fiber membranes, is anchored with tubesheets at both ends with the hollow fiber membranes being in the opened state, and a container having at least a supply port of a first gas, a discharge port of the first gas, a supply port of a second gas and a discharge port of the second gas, the hollow fiber membrane element being loaded into the container such that the space communicating with the hollow side of the hollow fiber membranes is isolated from the space communicating with the outer side of the hollow fiber membranes, wherein (a) the inner diameter of the hollow fiber membranes is larger than 400 μm, suitably from more than 500 μm to less than 1,500 μm, (b) the water vapor permeation rate ($P'_{H2O}$) of the hollow fiber membranes is $0.5 \times 10^{-3}$ cm$^3$ (STP)/cm$^2$·sec·cm Hg or more, (c) the ratio ($P'_{H2O}/P'_{O2}$) of the water vapor permeation rate to the oxygen gas permeation rate of the hollow fiber membranes is 10 or more, and (d) the elongation at tensile break of the hollow fiber membrane after hot water treatment in hot water at 100° C. for 50 hours is 80% or more of that before the hot water treatment. In particular, the present invention relates to a humidifying apparatus for fuel cells, where if the effective length of the hollow fiber membrane element is L and the inner diameter of the container into which the hollow fiber membrane element is loaded is D, L/D is 1.8 or more.

Furthermore, the present invention relates to a humidifying apparatus for fuel cells, constructed such that the hollow fiber membrane bundle constituting the hollow fiber membrane element has a membrane filling percentage of 35 to 55%, that 50% or more of the outer periphery of the hollow fiber membrane bundle constituting the hollow fiber membrane element is covered with a film-like substance, that a first gas flowing on the hollow side of the hollow fiber membranes and a second gas flowing in the space on the outer side of the hollow fiber membranes countercurrently flow with intervention of the hollow fiber membranes, or that a core tube disposed along the hollow fiber membrane bundle is provided nearly in the center part of the hollow fiber membrane bundle constituting the hollow fiber membrane element and communication holes communicating between the core tube inside and the core tube outside is formed in the core tube to allow for introducing the second gas from the second gas supply port into the core tube and then into the space on the outer side of the hollow fiber membranes through the communication hole.

The present invention also relates to a humidifying apparatus for fuel cells, constructed such that a supply gas to a fuel cell is humidified or that the first gas is an exhaust gas from the cathode of a fuel cell and the second gas is air supplied to the cathode of the fuel cell.

BEST MODE FOR CARRYING OUT THE INVENTION

The humidifying apparatus for fuel cells of the present invention comprises a hollow fiber membrane element in which a hollow fiber membrane bundle comprising a large number of hollow fiber membranes is anchored with tubesheets at both ends, while keeping the hollow fiber membranes in the opened state, and a container having at least a first gas supply port, a first gas discharge port, a second gas supply port and a second gas discharge port, the hollow fiber membrane element being loaded into the container such that the space communicating with the hollow side of the hollow fiber membranes is isolated from the space communicating with the outer side of the hollow fiber membranes.

Figure 1:
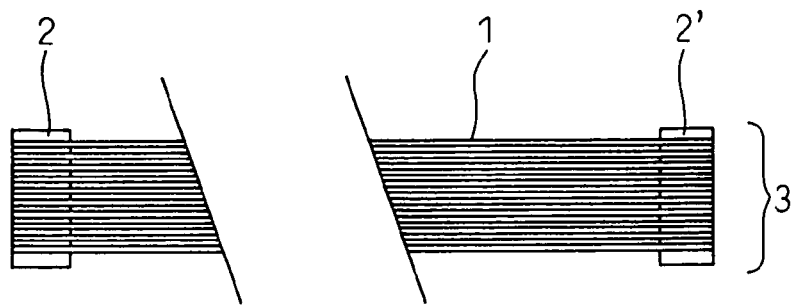
FIG. 1 is a longitudinal cross-sectional view roughly showing one example of the hollow fiber membrane element constituting the humidifying apparatus for fuel cells of the present invention.

FIG. 1 is a longitudinal cross-sectional view roughly showing one example of the hollow fiber membrane element constituting the humidifying apparatus for fuel cells of the present invention. A large number (usually from several tens to several hundreds of thousands) of hollow fiber membranes 1 are bundled nearly in parallel to form a hollow fiber membrane bundle. The hollow fiber membrane bundle is anchored at both ends thereof with a tubesheet 2,2' comprising a thermoplastic resin such as polyolefin or a curable resin such as epoxy resin, while keeping the hollow fiber membranes in the opened state, whereby a hollow fiber membrane element 3 is constructed. The follow fiber membranes are preferably bundled in a so-called twilled state by alternately cross-arranging the hollow fiber membranes every 1 to 100 membranes at a small angle of 30° or less with respect to the axial direction of the hollow fiber membrane bundle, and as the entire hollow fiber membrane bundle, nearly in parallel.

Figure 2:
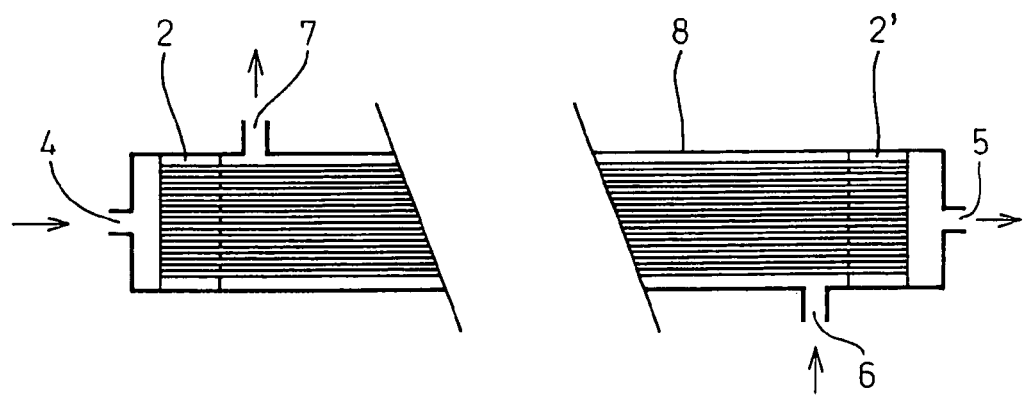
FIG. 2 is a longitudinal cross-sectional view roughly showing one example of the humidifying apparatus for fuel cells of the present invention.

FIG. 2 is a longitudinal cross-sectional view roughly showing one example of the humidifying apparatus for fuel cells of the present invention. At least one hollow fiber membrane element 3 is loaded into a container 8 having at least a first-gas supply port 4, a first-gas discharge port 5, a second-gas supply port 6 and a second-gas discharge port 7 such that the space communicating with the hollow side of the hollow fiber membranes is isolated from the space communicating with the outer side of the hollow fiber membranes.

More specifically, the space in the container is partitioned by tubesheets and the space between two tubesheets 2 and 2' in the container is divided into a space on the hollow side of each hollow fiber membrane and a space on the outer side of the hollow fiber membranes. A first gas supplied from the first-gas supply port 4 is introduced from the opening of the hollow fiber membranes on the end face of the tubesheet 2 into the hollow side of the hollow fiber membranes, flows through the hollow side of the hollow fiber membranes, flows out from the opening of the hollow fiber membranes on the end face of the tubesheet 2' on the opposite side, and is discharged from the first-gas discharge port 5. On the other hand, a second gas supplied from the second-gas supply port 6 flows through the space on the outer side of the hollow fiber membrane and is discharged from the second discharge port 7. During this process, each gas flows while contacting with the inner or outer surface of the hollow fiber membrane and therefore, water vapor in the gas having a higher water vapor partial pressure selectively permeates though the hollow fiber membrane into the gas having a lower water vapor partial pressure, whereby humidification is effected.

In FIG. 2, the arrows show the directions of gas flows.

The pressure of the gas supplied to a solid polymer-type fuel cell or the gas discharged therefrom varies depending on use conditions of the fuel cell, but the gas pressure is generally on the order of 1 to 4 atm (from 0 to 3 atm as gauge pressure). Particularly, a low pressure of approximately from 1 to 3 atm (from 0 to 2 atm as the gauge pressure) is used. As is apparent, on considering the case of humidifying air supplied to the cathode by using, as a humidifying gas, the cathode exhaust gas containing a large amount of water, which is generated in the cathode of a fuel cell, the pressure loss must be suppressed to a very low level in the humidifying apparatus for fuel cells so that a low-pressure gas can be humidified with a low-pressure gas and the power required for pressurizing the gas can be reduced as much as possible.

The pressure loss in the humidifying apparatus is mainly generated when the gas flows on the hollow side of the hollow fiber membranes and when the gas flows in a space on the outer side of the hollow fiber membranes.

For lowering the pressure loss of the gas passing through the hollow side of the hollow fiber membranes, a method of shortening the hollow fiber membranes may be considered. However, if short hollow fiber membranes are used, the ratio of the membrane area embedded in tubesheets at both ends of the hollow fiber membranes and not usable for humidification increases and an economical humidifying apparatus can be hardly obtained. Moreover, when an equal humidification amount is intended to obtain by shortening the hollow fiber membranes, a larger number of hollow fiber membranes are necessary and, as described later, assuming that the effective length of the hollow fiber membrane element is L and the inner diameter of the container into which the hollow fiber membrane element is loaded is D, L/D becomes small and, as a result, a channeling occurs in the gas flow in the space on the outer side of the hollow fiber membranes and the humidification efficiency decreases.

The inner diameter of the hollow fiber separation membranes for use in the humidifying apparatus of the present invention is larger than 400 µm. The lower limit of the inner diameter is preferably more than 400 µm, more preferably more than 500 µm. The upper limit of the inner diameter is preferably less than 1,500 µm, more preferably less than 800 µm. The inner diameter is typically from more than 400 µm to less than 1,500 µm, preferably from more than 500 µm to less than 1,500 µm. When the inner diameter of the hollow fiber membrane is more than 400 µm, preferably 410 µm or more, or more preferably more than 500 µm, even if hollow fiber membranes having a length several hundreds times or more the inner diameter are used, the pressure loss can be suppressed to a very low level. In this case, the ratio of the membrane area embedded in tubesheets and not usable for humidification becomes small and an economical humidifying apparatus can be obtained. Furthermore, as described later, assuming that the effective length of the hollow fiber membrane element is L and the inner diameter of the container into which the hollow fiber membrane element is loaded is D, L/D can be made large of a certain value or more and therefore, the humidification efficiency can be elevated.

On the other hand, if the inner diameter of the hollow fiber membranes is 1,500 µm or more, the number of hollow fiber membranes loadable into a predetermined volume is limited to decrease the effective membrane area and the humidification efficiency can be hardly elevated. Otherwise, the apparatus must be made large and this is not preferred. Moreover, if the inner diameter of the hollow fiber membranes is 1,500 µm or more, the hollow fiber membranes are readily deformed and the production of the hollow fiber membranes becomes difficult. If the membrane thickness is increased so as to elevate the strength of the hollow fiber membranes, the water vapor permeation rate becomes small and a humidifying apparatus having high humidification efficiency can hardly be obtained.

The water vapor permeation rate ($P'_{H2O}$) of the hollow fiber membranes for use in the humidifying apparatus of the present invention is $0.5 \times 10^{-3}$ cm$^3$ (STP)/cm$^2$·sec·cm Hg or more, preferably $2.0 \times 10^{-3}$ cm$^3$ (STP)/cm$^2$·sec·cm Hg or more, at a temperature of 80° C. Also, the ratio ($P'_{H2O}/P'_{O2}$) of the water vapor permeation rate to the oxygen gas permeation rate is 10 or more, preferably 100 or more, at a temperature of 80° C.

If the water vapor permeation rate ($P'_{H2O}$) of the hollow fiber membranes is less than $0.5 \times 10^{-3}$ cm$^3$ (STP)/cm$^2$·sec·cm Hg, a sufficiently large humidification amount cannot be obtained and, to obtain the same humidification amount, excess hollow fiber membranes must be disadvantageously used. If the ratio ($P'_{H2O}/P'_{O2}$) of the water vapor permeation rate to the oxygen gas permeation rate is less than 10, the gas components other than water vapor readily permeate through the hollow fiber membranes and this is not preferred. For example, when air supplied to the cathode is humidified with the exhaust gas from the cathode, the oxygen gas partial pressure of the exhaust gas may become smaller than the oxygen gas partial pressure of the air to allow for permeation of the oxygen gas from the air to the exhaust gas side. In this case, if the ratio ($P'_{H2O}/P'_{O2}$) of the water vapor permeation rate to the oxygen gas permeation rate is less than 10, a large amount of oxygen gas permeates to decrease the oxygen gas concentration in the supplied air and the output of the fuel cell disadvantageously lowers.

The hollow fiber separation membranes for use in the humidifying apparatus of the present invention has hot water resistance such that the elongation at tensile break after hot water treatment in hot water at 100° C. for 50 hours can be 80% or more, preferably 90% or more, of the elongation at tensile break before the hot water treatment. The solid polymer membrane-type fuel cell stack is used at a temperature of about 80° C. and therefore, the humidifying apparatus is also operated at a temperature at the same level. Accordingly, the hollow fiber membrane always comes into contact with a gas containing a large amount of water vapor under the temperature condition of about 80° C. The hollow fiber membranes of which the elongation at tensile break can be, even after hot water treatment in hot water at 100° C. for 50 hours, 80% or more of the elongation at tensile break before the hot water treatment does not undergo hydrolysis even with hot water at 100° C. and therefore, can be used for humidification with good reliability over a long period of time.

The hollow fiber separation membrane for use in the humidifying apparatus of the present invention may be either a porous membrane or a non-porous membrane but is preferably a non-porous membrane because the porous membrane has a problem that components other than water vapor readily mingle with the supply gas. Particularly, an asymmetric non-porous membrane gives a high water vapor permeation rate and is preferred. The construction material of the membrane is preferably a material excellent in heat resistance, chemical resistance, durability and hydrolysis resistance in view of use conditions of coming into contact with water vapor or oxygen gas at a high temperature of about 80° C.

Suitable examples of the porous membrane include perfluorocarbon resin having a sulfonic acid group, polyethylene resin, polypropylene resin, polyvinylidene fluoride resin, polyethylene tetrafluoride resin, polysulfone resin, polyethersulfone resin, polyamide resin, polyamidoimide resin, polyetherimide resin, polycarbonate resin and cellulose derivative resin.

Suitable examples of the non-porous membrane include polyimide resin, polysulfone resin, perfluorocarbon resin having a sulfonic acid group, polyethersulfone resin, polyamide resin, polyamidoimide resin, polyetherimide resin, polycarbonate resin, polyphenylene oxide resin, polyacetylene resin and cellulose derivative resin.

In particular, the hollow fiber membrane for use in the humidifying apparatus for fuel cells of the present invention is preferably an asymmetric hollow fiber membrane comprising an aromatic polyimide. With respect to the asymmetric hollow fiber membrane comprising an aromatic polyimide, as described in detail, for example, in U.S. Pat. No. 6,464,755 by several inventors including the present inventors, a membrane having excellent heat resistance and durability, high water vapor permeation rate, high selective permeability to water vapor and excellent hot water resistance can be produced and therefore, a humidifying apparatus with very high efficiency and high reliability can be obtained.

The asymmetric hollow fiber separation membrane usable for the humidifying apparatus of the present invention can be easily produced by using a polymer solution having dissolved therein the resin described above, according to a method proposed by Loeb et al. (for example, in U.S. Pat. No. 3,133,132), that is, a dry-wet process where the polymer solution is extruded from a nozzle into an objective shaped article, passed through an air or nitrogen atmosphere and then immersed in a coagulation bath.

In one preferred embodiment, the hollow fiber separation membrane for use in the humidifying apparatus of the present invention preferably has, as disclosed in U.S. Pat. No. 6,464,755, an asymmetric structure consisting of a skin layer (separation layer) and a porous layer (support layer), where the gas permeation rate of the porous layer is, in terms of the helium gas permeation rate ($P'_{He}$), $2.5 \times 10^{-3}$ cm$^3$ (STP)/cm$^2$·sec·cm Hg or more, more preferably $3.0 \times 10^{-3}$ cm$^3$ (STP)/cm$^2$·sec·cm Hg or more, the tensile strength measured as a hollow fiber membrane is 2.5 kgf/mm$^2$ or more, more preferably 3.0 kgf/mm$^2$ or more, and the elongation at break is 10% or more, more preferably 15% or more.

The helium permeation rate ($P'_{He}$) of the porous layer (support layer) of the hollow fiber membrane indicates the gas permeation resistance of the porous layer (support layer) of the membrane (with a larger value indicating lower resistance) and this is a value measured by the following measurement method. That is, the helium permeation rate ($P'_{He}$) is defined as the permeation rate of helium gas when the skin layer on the surface of the asymmetric hollow fiber membrane is removed by oxygen plasma treatment and the ratio of the helium gas permeation rate to the nitrogen gas permeation rate reaches a region where the ratio cannot be substantially recognized as the permeation rate ratio of a homogeneous membrane. More specifically, the helium permeation rate is the permeation rate of helium gas when a membrane, where the ratio ($P'_{He}/P'_{N2}$) of the helium permeation rate to the nitrogen permeation rate is 20 or more before the plasma treatment, is plasma-treated and the above-mentioned permeation rate ratio ($P'_{He}/P'_{N2}$) is reduced to 1.2 or less.

The mechanical strength of the hollow fiber separation membrane is expressed by the tensile strength and elongation at break in a tensile test using a hollow fiber obtained from the membrane. These are values as measured using a tensile tester at a temperature of 23° C. with an effective sample length of 20 mm and a pulling rate of 10 mm/min. The tensile strength is the value obtained by dividing the stress at breakage of the hollow fiber membrane by the cross-sectional area of the hollow fiber membrane [unit: kgf/mm$^2$], and the elongation at break is $(L-L_0)/L_0 \times 100$ [unit: %] where $L_0$ is the original length of the hollow fiber and L is the length at tensile breakage.

The tensile strength of the hollow fiber membrane is preferably 2.5 kgf/mm$^2$ or more, and the elongation at break is preferably 10% or more. The hollow fiber membrane having such mechanical strength is particularly useful because it can be handled without readily causing rupture or breakage and has excellent pressure resistance and durability.

The production method of the asymmetric hollow fiber separation film satisfying the above-described helium gas permeation rate ($P'_{He}$) of the porous layer and the tensile strength and breaking elongation of the hollow fiber membrane is disclosed in U.S. Pat. No. 6,464,755 (the contents thereof are incorporated into the present invention by way of reference).

As for the thickness of the asymmetric hollow fiber separation membrane usable for the humidifying apparatus of the present invention, the skin layer is usually from 10 to 200 nm, preferably from 20 to 100 nm, and the porous layer is usually from 20 to 200 μm, preferably from 30 to 100 μm.

Assuming that the effective length of the hollow fiber membrane element is L and the inner diameter of the container into which the hollow fiber membrane element is loaded is D, the humidifying apparatus of the present invention is preferably constructed to have L/D of 1.8 or more, more preferably from 2 to 6, because the humidification efficiency can be elevated.

Figure 3:
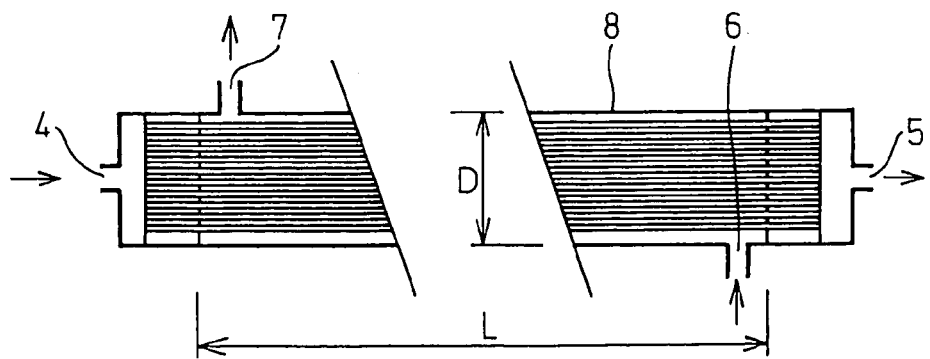
FIG. 3 is a longitudinal cross-sectional view roughly showing one example of the humidifying apparatus for fuel cells of the present invention, in which L and D are indicated.

L and D are indicated in FIG. 3 which is a longitudinal cross-sectional view roughly showing one example of the hollow fiber membrane element loaded in the container. In FIG. 3, the arrows each shows the direction of the gas flow.

The effective length L of the hollow fiber membrane element is the length of the portion excluding the tubesheets formed at both ends of the hollow fiber membrane bundle and actually contributing to the water vapor permeation, and the inner diameter D of the container is the diameter of the cross-section perpendicular to the longitudinal direction of the hollow fiber membrane bundle, of the container having loaded thereinto the hollow fiber membrane element. In the case of a cylindrical container, D is the diameter of the circular cross-section of the cylinder. The container is usually cylindrical. In the case where the container is rectangular parallelopiped, the inner diameter is defined as the diameter of a circle having the same area as the area of the cross-section perpendicular to the longitudinal direction of the hollow fiber membrane bundle, of the container. The inner diameter D of the container indicates the degree of spreading when the second gas introduced into the space on the outer side of the hollow fiber membranes flows in the space on the outer side of the hollow fiber membranes.

If L/D is less than 1.8, the length of the hollow fiber membrane element is relatively short and the pressure loss of the first gas flowing on the hollow side of the hollow fiber membranes is easily kept low. However, on the other hand, the degree of spreading of the second gas flowing in the space on the outer side of the hollow fiber membranes becomes relatively large for the effective length of the hollow fiber element and the second gas does not flow in the longitudinal direction of the hollow fiber membranes but flows, in a large degree, in the direction crossing the hollow fiber membranes. That is, the second gas deviates from the piston flow along the hollow fiber membranes, which can maximally bring out the humidification ability of the hollow fiber membranes, and a short-pass or channeling is generated, namely, the gas flow rate is partially high or low. When a short-pass or channeling is generated, the humidification efficiency decreases and this is not preferred.

If L/D exceeds 6, the length of the hollow fiber membrane element is relatively long and the pressure loss of the first gas flowing on the hollow side of the hollow fiber membranes becomes difficult to keep low.

Incidentally, when in the hollow fiber membrane element used, the outer periphery of the hollow fiber membrane bundle is covered with a film-like substance and the degree of spreading of the second gas flowing on the outer side of the hollow fiber membranes is controlled, D means the inner diameter of the space surrounded by the film-like substance but not the inner diameter of the container.

In the humidifying apparatus of the present invention, the membrane filling percentage of the hollow fiber membrane bundle constituting the hollow fiber membrane element, that is, the ratio of the sum total of cross-sectional areas, perpendicular to the longitudinal direction, of respective hollow fiber membranes constituting the hollow fiber membrane bundle to the cross-sectional area, perpendicular to the longitudinal direction, of the hollow fiber membrane bundle constituting the hollow fiber membrane element, is preferably from 35 to 55%, more preferably from 35 to 45%.

The membrane filling percentage of the hollow fiber membrane bundle indicates a ratio of the area occupied by hollow fiber membranes in the cross-sectional area perpendicular to the longitudinal direction of the hollow fiber membrane bundle, and the value (%) obtained by subtracting the membrane filling percentage (%) from 100 (%) indicates the ratio of the space on the outer side of hollow fiber membranes in the hollow fiber membrane bundle.

If the membrane filling percentage is less than 35%, the number of hollow fiber membranes constituting the hollow fiber membrane bundle is too small and efficient humidification can be hardly obtained. At the same time, a portion having a large membrane filling percentage and a portion having a small membrane filling percentage are liable to be locally generated and this gives rise to a short-flow or channeling. On the other hand, if the membrane filling percentage exceeds 45%, particularly 55%, the space on the outer side of hollow fiber membranes becomes small to cause a short-pass or channeling and also, the pressure loss of the second gas flowing in the space on the outer side of hollow fiber membranes can hardly be reduced.

In the humidifying apparatus of the present invention, a film-like substance preferably covers 50% or more, more preferably on the order of 80 to 95%, of the outer periphery of the hollow fiber membrane bundle, in the portion effective for humidification, of the hollow fiber membrane element.

When the hollow fiber membrane element is loaded into the container, a space is sometimes generated between the outer periphery of the hollow fiber membrane bundle and the inner wall surface of the container. In this space, the second gas introduced into the space on the outer side of hollow fiber membranes flows, but the second gas flowing in this space does not come into contact with the hollow fiber membranes and therefore, this flow cannot contribute to the water vapor permeation at all. In the humidifying apparatus of the present invention, the film-like substance covering the outer periphery of the hollow fiber membrane bundle is provided so as to prevent the generation of a gas flow not contributing to the water waver permeation at all.

The film-like substance is disposed not to disturb the gas flow entering or outgoing from the first-gas supply port, first-gas discharge port, second-gas supply port and second-gas discharge port provided in the container.

The film-like substance may be formed of any material as long as it is substantially impermeable or sparingly permeable to the gas introduced into the apparatus and has durability at a temperature of about 80° C. or in an atmosphere where water content or oxygen gas is present, but suitable examples of the material which can be used include plastic materials such as polypropylene, polyester and polyimide, and films of aluminum or stainless steel. The film thickness is not particularly limited but is preferably on the order of tens of μm to several mm.

The humidifying apparatus of the present invention is preferably constructed such that the first gas flowing in the hollow fiber membranes and the second gas flowing in the space on the outer side of the hollow fiber membranes flow countercurrently.

Out of these gas flows, one is a gas for humidification, which is supplied in the state of having a high water vapor content, and another is a gas to be humidified, which is supplied in the state of having a low water vapor content. The driving force for causing permeation of water vapor through the membranes is usually the difference in the water vapor partial pressure near the membrane surfaces between two gases opposing each other through the membranes. Accordingly, a very large permeation amount of water vapor can be achieved by pressurizing the gas for humidification and depressurizing the gas to be humidified. However, the pressure of the gas supplied to a fuel cell or the gas discharged from a fuel gas is determined by the use conditions of the fuel cell. Particularly, the gas pressure is low and approximately from 1 to 3 atm (from 0 to 2 atm as gauge pressure) and there is a limit in increasing the efficiency of water vapor permeation by elevating the pressure of the gas for humidification.

The countercurrent flow is particularly optimal under these conditions because of the following reasons.

That is, when the water vapor permeates through the membranes, the water vapor partial pressure in the vicinity of the membrane surfaces on the permeation side elevates and the driving force for the subsequently occurring permeation of water vapor through membranes is weakened. When the gas elevated in the water vapor partial pressure near the membrane surfaces on the permeation side is displace with a gas to be humidified having a low water vapor partial pressure, the driving force for causing the permeation of water vapor through the membranes is not weakened.

When the humidifying apparatus is constructed such that the gas flowing in the inner side of the hollow fiber membranes and the gas flowing in the space on the outer side of the hollow fiber membranes flow countercurrently, the gas elevated in the water vapor partial pressure near the membrane surfaces on the permeation side can be continuously displaced with a gas to be humidified having a low water vapor partial pressure and moreover, as a gas to be humidified having a low water vapor partial pressure, which is not yet humidified, flows on the permeation side of the membranes in the portion where the gas for humidification decreased in the water vapor partial pressure resulting from permeation of water vapor is flowing, the water vapor can be permeated over the entire length of the hollow fiber membranes and the humidification efficiency can be elevated.

If the gases flow not countercurrently but, for example, the gas for humidification and the gas to be humidified are rendered to flow in the same direction along the hollow fiber membranes, when both gases are introduced and start flowing on both sides of the membranes, a large amount of water vapor permeates by virtue of the maximum difference in the water vapor partial pressure between both sides of the membranes but as the gases flow along the membranes, the water vapor partial pressure of the gas for humidification decreases and at the same time, the water vapor partial pressure of the gas to be humidified is elevated, as a result, the difference in the water vapor pressure between two sides of the membranes becomes small and the permeation of water vapor scarcely occurs. Therefore, the humidification efficiency of the hollow fiber membranes as a whole decreases.

In the humidifying apparatus of the present invention, in order to allow for a countercurrent flow of the gas for humidification and the gas to be humidified along the hollow fiber membranes, the first-gas supply port, first-gas discharge port, second-gas supply port and second-gas discharge port are preferably disposed in the container such that the first gas is introduced into the hollow fiber membranes from the opening of the tubesheet at one end part of the hollow fiber membrane element, allowed to flow in the hollow fibers, and discharged from the opening of the tubesheet at another end part of the hollow fiber membrane element, and the second gas is introduced into the space outside the hollow fiber membranes in the container, in the vicinity of the tubesheet of the hollow fiber element on the side of discharging the first gas, allowed to flow in the space outside the hollow fiber membranes in the container, and discharged from the container in the vicinity of the tubesheet of the hollow fiber membrane element on the side of introducing the first gas.

The second-gas supply port may be disposed in the container such that the second gas is introduced from the supply port directly into the space on the outer side of the hollow fiber membranes in the container.

The humidifying apparatus is more preferably constructed such that a core tube disposed along the hollow fiber membranes is provided nearly in the center part of the hollow fiber membrane bundle of the hollow fiber membrane element, the core tube passes through the tubesheet on the side of allowing the first gas to flow outside the hollow fiber membranes, communication holes communicating between the inside and the outside of the core tube are formed in the vicinity of the tubesheet to face the space on the outer side of the hollow fiber membranes, and the second gas supplied from the second-gas supply port is introduced into the core tube, flows out through the communication holes into the space on the outer side of the hollow fiber membranes in the container, flows along the hollow fiber in the space on the outer side of the hollow fiber membranes, and is discharged outside the container through the second-gas discharge port provided in the container from the space on the outer side of the hollow fiber membranes, in the vicinity of the tubesheet on the side of introducing the first gas into the hollow fiber membranes.

The second gas introduced can flow countercurrently along the hollow fiber membranes from the center part of the hollow fiber membrane bundle and at the same time, can flow uniformly in a radial manner toward the outer side direction of the hollow fiber membrane bundle, so that a short-pass or channeling is hardly generated and the humidification efficiency can be increased.

In the humidifying apparatus of the present invention, it is preferred that the first gas flowing on the inner side of the hollow fiber membranes is a gas for humidification and the second gas flowing in the space on the outer side of the hollow fiber membranes is a gas to be humidified.

In the humidifying apparatus of the present invention, the container and the like may be formed of any material as long as it is durable at a temperature of about 80° C. or in an atmosphere where water content or oxygen gas is present, and may be formed of a metal such as stainless steel or aluminum alloy, a resin or a fiber-reinforced resin. The container may not be an integrated device but may be fabricated from a cylindrical part and a cap part. If desired, packing materials, adhesive, bolts, nuts and the like are used. Also, the humidifying apparatus of the present invention may comprise a pretreatment device such as filters for removing impurities in the gas or substances having possibility of deteriorating the membrane performance, for example, oil mist, dust and trace chemical substances contained in the gas. If desired, the humidifying apparatus of the present invention further comprises heat exchangers or heaters for controlling the temperature of gas, and pressure-regulating devices such as compressor for regulating the pressure of gas.

The present invention is further described below by referring to FIG. 4 which is a longitudinal cross-sectional view roughly showing another example of the humidifying apparatus of the present invention.

Figure 4:
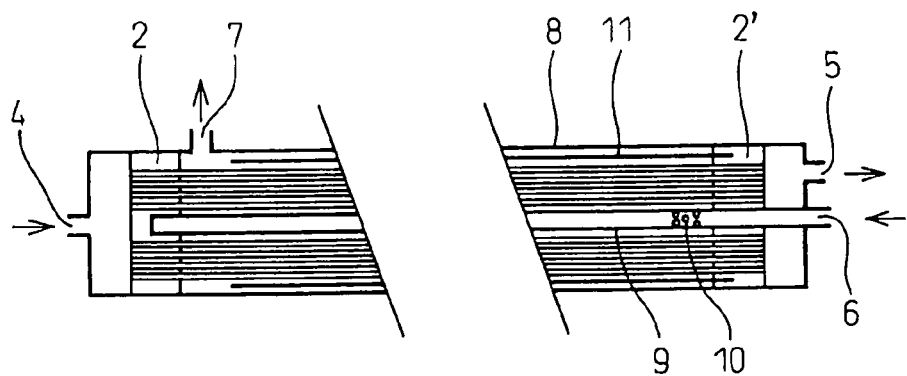
FIG. 4 is a longitudinal cross-sectional view roughly showing another example of the humidifying apparatus for fuel cells of the present invention.

In FIG. 4, both ends of the hollow fiber membrane bundle comprising hollow fiber membranes 1 are anchored with tube sheets 2,2' while keeping the end part of the hollow fiber membranes in the opened state. Nearly in the center part of the hollow fiber membrane bundle, a core tube 9 is provided along the hollow fiber membranes. The core tube 9 is buried in the tube sheet 2 on the first-gas supply port 4 side and pierces through the tube sheet 2' on the first-gas discharge port 5 side to communicate with the second-gas supply port 6. Also, in the core tube 9, communication holes 10 communicating between the inside of the core tube and the space on the outer side of the hollow fiber membranes are disposed along the outer circumference of the core tube. The outer periphery of the hollow fiber membrane bundle is covered with a film-like substance 11. The film-like substance 11 is buried in the tubesheet 2' on the first-gas discharge port side and thereby fixed. In the portion facing the second-gas discharge port 7 provided near the tubesheet 2, the hollow fiber membrane bundle is not covered with the film-like substance.

In this apparatus, the gas for humidification containing a large amount of water vapor is introduced from the first-gas supply port 4 and, after flowing in the hollow fiber membrane, is discharged from the first-gas discharge port 5. On the other hand, the gas to be humidified is introduced from the second-gas supply port 6, allowed to flow in the core tube 9, introduced from the communication holes 10 into the space on the outer side of the hollow fiber membrane, allowed to flow along the hollow fiber membranes substantially in a countercurrent manner with the flow of the gas for humidification, and is discharged from the second-gas discharge port 7. During this process, the gas for humidification and the gas to be humidified each comes into contact with the inner or outer surface of the hollow fiber membranes and the water vapor in the gas for humidification having a higher water vapor partial pressure permeates through the hollow fiber membranes from the inside of the hollow fiber membranes to the outside of the hollow fiber membranes, as a result, the gas to be humidified flowing in the space on the outer side of the hollow fiber membranes is humidified and discharged from the second-gas discharge port.

In FIG. 4, the arrows show the directions of gas flows.

The humidifying apparatus of the present invention uses a hollow fiber yarn and therefore, this is a lightweight humidifying apparatus requiring no complicated driving or operation. Moreover, this humidifying apparatus can stably perform the humidification even when exposed for a long time at a temperature of about 80° C. which is an operating temperature of the fuel cell or in an atmosphere where water vapor, oxygen, hydrogen and the like are present, can increase the humidification efficiency while lowering the pressure loss of gas even when a low-pressure gas is used, can reduce permeation of components other than water vapor, is economical and therefore, can be suitably used for a fuel cell.

The humidifying apparatus of the present invention can be suitably used particularly when the air supplied to the cathode of a fuel cell is humidified with the exhaust gas from the cathode.

Figure 5:
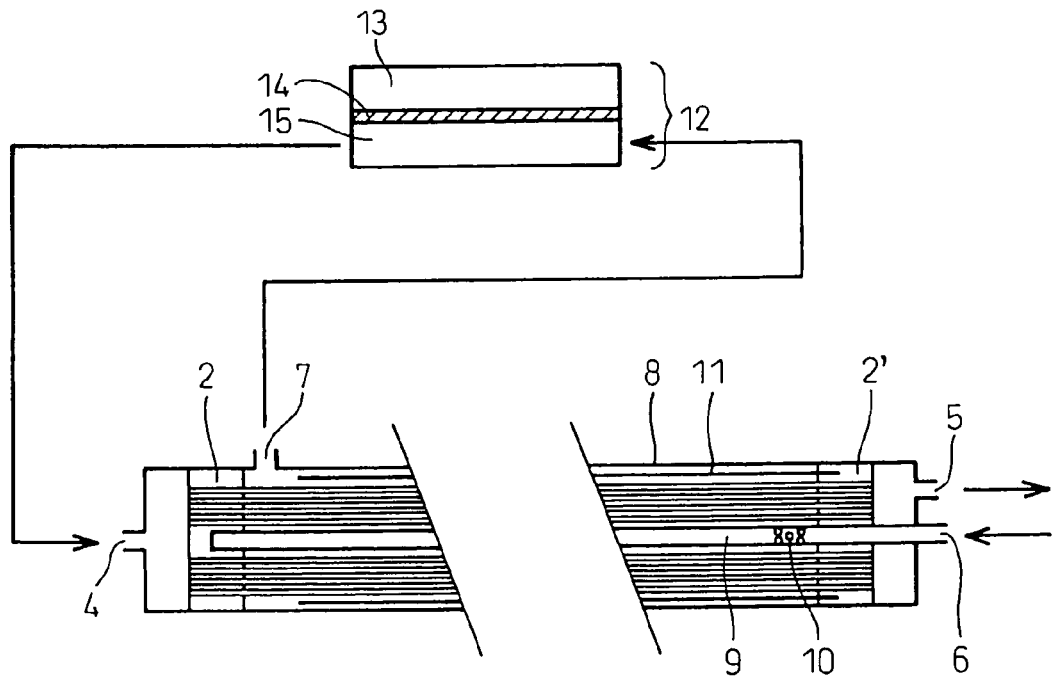
FIG. 5 is a schematic view showing one example of the mode of using the humidifying apparatus for fuel cells of the present invention.

FIG. 5 is a schematic view showing one example of the mode of using the humidifying apparatus for fuel cells of the present invention. In FIG. 5, the arrows show the directions of gas flows.

In FIG. 5, the solid polymer-type fuel cell 12 comprises an anode 13, a solid polymer electrolyte membrane 14 and a cathode 15. To the cathode 15, air is supplied. The air is collected from the atmosphere, supplied from the second-gas supply port 6 to the humidifying apparatus of the present invention, allowed to pass through the communication holes 10, introduced into the space on the outer side of the hollow fiber membranes in the apparatus, discharged from the second-gas discharge port 7, and supplied to the cathode 15 of the fuel cell. The exhaust gas discharged from the cathode 15 is guided to the first-gas supply port 4 of the humidifying apparatus of the present invention and then introduced into the apparatus. Subsequently, the exhaust gas enters into the hollow side of the hollow fiber membranes from the openings of the hollow fibers of the tubesheet 2, allowed to flow in the hollows and flow out from the openings of the hollow fibers of the tubesheet 2', and is discharged outside the apparatus from the first-gas discharge port 5.

The exhaust gas discharged from the cathode 5 is at a temperature of about 80° C. and contains a large amount of water produced in the fuel cell 12. The exhaust gas introduced into the humidifying apparatus and the air flow in the countercurrent directions to each other with intervention of the hollow fiber membrane while contacting with the membranes. In this process, the water vapor in the exhaust gas permeates through the membrane and humidifies the air. Also, in this process, the air humidified receives the heat of the exhaust gas. The humidified and heated air is discharged from the second-gas discharge port 7 and supplied to the cathode of the fuel cell.

EXAMPLES

The humidifying apparatus of the present invention is described in greater detail below by referring to Examples. However, the present invention is not limited to the following Examples.

The measuring methods in Examples are as follows.

(Measuring Method of Rotational Viscosity)

The rotational viscosity of the polyimide solution was measured at a temperature of 100° C. by using a rotational viscometer (rotor shear rate: 1.75/sec).

(Measuring Method of Water Vapor Permeation Performance of Hollow Fiber Membrane)

About 10 hollow fiber membranes, a stainless steel pipe and an epoxy resin-based adhesive were used to prepare an element for permeation performance evaluation having an effective length of 20 mm, and the element prepared was loaded into a stainless steel container to produce a pencil module. A fixed amount of nitrogen gas having a water vapor concentration of about 23 vol % was supplied to the outer side of the hollow fiber membranes of the pencil module, and water vapor separation was performed while passing a fixed amount of carrier gas (Ar gas) to the permeation side. The water vapor amounts of the non-permeating gas and permeating gas were detected by a mirror dew-point meter. The water vapor permeation rate of the membrane was calculated from the measured water vapor amounts (water vapor partial pressures), the amount of the supply gas and the effective membrane area. These measurements were performed at 80° C.

(Measuring Method of Oxygen Gas Permeation Performance of Hollow Fiber Membranes)

About 15 hollow fiber membranes, a stainless steel pipe and an epoxy resin-based adhesive were used to prepare an element for permeation performance evaluation having an effective length of 10 cm, and the element prepared was loaded into a stainless steel container to produce a pencil module. A pure oxygen gas at a fixed pressure was supplied to the module and the permeation flow rate was measured. The oxygen gas permeation rate was calculated from the measured amount of oxygen gas permeated, the supply pressure and the effective membrane area. These measurements were performed at 80° C.

(Measurement of Tensile Breaking Elongation of Hollow Fiber Membranes)

The elongation at tensile break was measured by using a tensile tester with an effective length of 20 mm and a pulling rate of 10 mm/min. The measurement was performed at 23° C.

(Measurement of Hot Water Resistance of Hollow Fiber Membranes)

Hollow fiber membranes having a known elongation at tensile break were used as the sample. The hollow fiber membranes and ion exchanged water were placed in a stainless steel container and, after sealing it, the container was placed in an oven at 100° C. and held for 50 hours, thereby hot-water treating the hollow fiber membranes. After the hot water treatment, the hollow fiber membranes were taken out from the container and dried in an oven at 100° C. The elongation at tensile break of the dried hollow fiber membranes was measured according to the tensile testing method described above. The retention [%] of the elongation at tensile break was used as the index for showing the hot water resistance.

(Humidification Test)

When the supply gas pressure was almost the atmospheric pressure, an air having a predetermined pressure, temperature and relative humidity was supplied to the first-gas supply port and second-gas supply port of the humidifying apparatus while controlling the flow rate by a gas flow rate controlling valve in front of each supply port. The discharge ports were opened to the atmosphere. When the supply gas pressure was 0.2 MPaG, an air having a predetermined pressure, temperature and relative humidity was supplied to respective supply ports of the humidifying apparatus and the flow rate of gas discharged from each discharge port was controlled by a flow rate controlling valve.

The pressure was measured by a water manometer fixed immediately before each of the first-gas and second-gas supply ports and immediately after the respective discharge ports.

Also, for both the first gas and the second gas, the water contents of the gas supplied and the gas discharged were measured by a mirror dew-point meter. When the air had a water content in the range not measurable by a dew-point meter, the dew point was lowered by mixing the air with an air having a known dew point at a predetermined ratio and after measuring the dew point, the water content was calculated from the measured dew point.

(Preparation of Polyimide (a) Solution)

In a separable flask, 52.960 g of 3,3',4,4'-biphenyltetracarboxylic acid dianhydride, 53.309 g of 2,2'-bis(3,4-dicarboxyphenyl)hexafluoropropane dianhydride and 60.793 g of 4,4'-diaminodiphenylether were polymerized together with 820.37 g of a para-chlorophenol solvent at a polymerization temperature of 180° C. for 11 hours to obtain a Polyimide (a) solution having a rotational viscosity of 1,716 poise and a polymer concentration of 16 wt %.

(Preparation of Polyimide (b) Solution)

In a separable flask, 88.266 g of 3,3',4,4'-biphenyltetracarboxylic acid dianhydride and 61.273 g of diaminodiphenylether were polymerized together with 728.38 g of a para-chlorophenol solvent at a polymerization temperature of 180° C. for 7 hours to obtain a polyimide (b) solution having a rotational viscosity of 1,823 poise and a polymer concentration of 16 wt %.

(Production of Asymmetric Polyimide Hollow Fiber Membranes)

In a separable flask, 280 g of the polyimide (a) solution and 120 g of the polyimide (b) solution were stirred at a temperature of 130° C. for 3 hours to obtain a polyimide mixture solution. This mixture solution had a polymer concentration of 16 wt % and a rotational viscosity of 1,804 poise.

This polyimide mixture solution was filtered through a 400-mesh wire net and then ejected from the circular opening of a hollow fiber spinning nozzle having a circular opening and a core opening while simultaneously ejecting a nitrogen gas from the core opening, whereby a hollow fiber body was obtained. The ejected hollow fiber body was passed through a nitrogen atmosphere and then immersed in a coagulation solution comprising an aqueous ethanol solution in a predetermined concentration (from 70 to 80 wt %) at a temperature of 0° C. to obtain a wet fiber. This wet fiber was immersed in ethanol at a temperature of 50° C. for 2 hours, thereby completing the desolvating treatment. The fiber was further washed by immersing it in isooctane for 3 hours at a temperature of 70° C. to replace the solvent, then dried at a temperature of 100° C. to a bone-dry state and thereafter heat-treated at a predetermined temperature (from 200 to 300° C.) for one hour.

Six kinds of Asymmetric Polyimide Hollow Fiber Membranes A to F were produced by using a hollow fiber spinning nozzle having a different dimension or controlling the ejection amount of polyimide solution or the nitrogen gas ejected from the core opening. The dimension and water vapor permeation performance of each of Asymmetric Polyimide Hollow Fiber Membranes A to F obtained are shown in Table 1.

TABLE 1

| | Outer Diameter (μm) | Inner Diameter (μm) | $P'_{H2O}$ (cm$^2$ (STP)/ cm$^2 \cdot$ sec $\cdot$ cm Hg) | Retention of Breaking Elongation after Hot Water Treatment |
|---|---|---|---|---|
| Polyimide Hollow Fiber Membrane A | 1000 | 710 | $2.8 \times 10^{-3}$ | 95% |
| Polyimide Hollow Fiber Membrane B | 400 | 285 | $2.8 \times 10^{-3}$ | 94% |
| Polyimide Hollow Fiber Membrane C | 800 | 570 | $3.0 \times 10^{-3}$ | 93% |
| Polyimide Hollow Fiber Membrane D | 200 | 145 | $3.0 \times 10^{-3}$ | 97% |
| Polyimide Hollow Fiber Membrane E | 710 | 510 | $3.0 \times 10^{-3}$ | 94% |
| Polyimide Hollow Fiber Membrane F | 570 | 410 | $3.0 \times 10^{-3}$ | 96% |

Example 1

A hollow fiber membrane element using Polyimide Hollow Fiber Membrane A (inner diameter of hollow fiber membrane: 710 μm), where the effective length (L) of the hollow fiber membrane bundle was 360 mm (the length of each tubesheet was 50 mm, hereinafter the same), the membrane filling percentage was 40%, about 80% of the outer peripheral area of the hollow fiber membrane bundle was covered with a polyimide film along the outer circumference, and the inner diameter of the covering cylindrical film was 150 mm (D), was loaded into a cylindrical container having an inner diameter of 165 mm to produce a humidifying apparatus shown in FIG. 4 (L/D=2.4).

Air at almost atmospheric pressure, a temperature of 80° C. and a relative humidity of 95% was supplied as the first gas to the hollow side of the hollow fiber membrane 20 at a flow rate of 500 N liter/min, and air at almost atmospheric pressure, a temperature of 25° C. and a relative humidity of 10% was supplied as the second gas to the space on the outer side of the hollow fiber membrane at a flow rate of 500 N liter/min. These first and second gases were supplied to flow countercurrently.

The pressure and dew point of each gas were measured. As a result, the pressure loss when the first gas was flowing on the hollow side of the hollow fiber membranes was 2.4 kPa, the pressure loss when the second gas was flowing in the space on the outer side of the hollow fiber membranes was 0.1 kPa, and the total pressure loss was 2.5 kPa. Also, out of the water content in the first gas, the ratio of the water content permeated through the hollow fiber membranes and transferred to the second gas was 82%.

Comparative Example 1

A humidifying apparatus having substantially the same effective membrane area as in Example 1 and comprising a cylindrical container having the same inner diameter of 165 mm as in Example 1 was produced by using Polyimide Hollow Fiber Membrane B (inner diameter of hollow fiber membrane: 285 μm). More specifically, a hollow fiber membrane element, where the effective length (L) of the hollow fiber membrane bundle was 135 mm, the membrane filling percentage was 40%, about 80% of the outer peripheral area of the hollow fiber membrane bundle was covered with a polyimide film along the outer circumference, and the inner diameter of the covering cylindrical film was 150 mm (D), was loaded to produce a humidifying apparatus shown in FIG. 4 (L/D=0.9).

The same gases as in Example 1 were supplied to this apparatus to flow under the same conditions.

The pressure and dew point of each gas were measured. As a result, the pressure loss when the first gas was flowing on the hollow side of the hollow fiber membranes was 8.0 kPa, the pressure loss when the second gas was flowing in the space on the outer side of the hollow fiber membranes was 0.1 kPa, and the total pressure loss was 8.1 kPa. Also, out of the water content in the first gas, the ratio of the water content permeated through the hollow fiber membranes and transferred to the second gas was 36%.

Example 2

A hollow fiber membrane element using Polyimide Hollow Fiber Membrane A (inner diameter of hollow fiber membrane: 710 μm), where the effective length (L) of the hollow fiber membrane bundle was 600 mm and the membrane filling percentage was 40%, was loaded into a cylindrical container having an inner diameter of 200 mm (D) to produce a humidifying apparatus shown in FIG. 2 (L/D=3.0).

Air at almost atmospheric pressure, a temperature of 80° C. and a relative humidity of 95% was supplied as the first gas to the hollow side of the hollow fiber membrane at a flow rate of 1,500 N liter/min, and air at almost atmospheric pressure, a temperature of 25° C. and a relative humidity of 10% was supplied as the second gas to the space on the outer side of the hollow fiber membranes at a flow rate of 1,500 N liter/min. These first and second gases were supplied to countercurrently flow.

The pressure and dew point of each gas were measured. As a result, the pressure loss when the first gas was flowing on the hollow side of the hollow fiber membranes was 3.6 kPa, the pressure loss when the second gas was flowing in the space on the outer side of the hollow fiber membranes was 0.4 kPa, and the total pressure loss was 4.0 kPa. Also, out of the water content in the first gas, the ratio of the water content permeated through the hollow fiber membranes and transferred to the second gas was 87%.

Comparative Example 2

A humidifying apparatus having substantially the same effective membrane area as in Example 2 and comprising a cylindrical container having the same inner diameter of 200 mm (D) as in Example 2 was produced by using Polyimide Hollow Fiber Membrane B (inner diameter of hollow fiber membrane: 285 μm). More specifically, a hollow fiber membrane element, where the effective length (L) of the hollow fiber membrane bundle was 240 mm and the membrane filling percentage was 40%, was loaded to produce a humidifying apparatus shown in FIG. 2 (L/D=1.2).

The same gases as in Example 2 were supplied to this apparatus to flow under the same conditions.

The pressure and dew point of each gas were measured. As a result, the pressure loss when the first gas was flowing on the hollow side of the hollow fiber membrane was 18.8 kPa, the pressure loss when the second gas was flowing in the space on the outer side of the hollow fiber membrane was 0.6 kPa, and the total pressure loss was 19.4 kPa. Also, out of the water content in the first gas, the ratio of the water content permeated through the hollow fiber membrane and transferred to the second gas was 43%.

Example 3

A hollow fiber membrane element using Polyimide Hollow Fiber Membrane C (inner diameter of hollow fiber membrane: 570 μm), where the effective length (L) of the hollow fiber membrane bundle was 320 mm and the membrane filling percentage was 40%, was loaded into a cylindrical container having an inner diameter of 100 mm (D) to produce a humidifying apparatus shown in FIG. 2 (L/D=3.2).

Air at a pressure of 0.2 MPaG, a temperature of 80° C. and a relative humidity of 95% was supplied as the first gas to the hollow side of the hollow fiber membrane at a flow rate of 500 N liter/min, and air at a pressure of 0.2 MPaG, a temperature of 25° C. and a relative humidity of 5% was supplied as the second gas to the space on the outer side of the hollow fiber membrane at a flow rate of 500 N liter/min. These first and second gases were supplied to flow countercurrently.

The pressure and dew point of each gas were measured. As a result, the pressure loss when the first gas was flowing on the hollow side of the hollow fiber membrane was 2.6 kPa, the pressure loss when the second gas was flowing in the space on the outer side of the hollow fiber membrane was 0.2 kPa, and the total pressure loss was 2.8 kPa. Also, out of the water content in the first gas, the ratio of the water content permeated through the hollow fiber membranes and transferred to the second gas was 85%.

Comparative Example 3

A humidifying apparatus having substantially the same effective membrane area as in Example 3 and comprising a cylindrical container having the same inner diameter of 100 mm (D) as in Example 3 was produced by using Polyimide Hollow Fiber Membrane D (inner diameter of hollow fiber membrane: 145 μm). More specifically, a hollow fiber membrane element, where the effective length (L) of the hollow fiber membrane bundle was 80 mm and the membrane filling percentage was 40%, was loaded to produce a humidifying apparatus shown in FIG. 2 (L/D=0.8).

The same gases as in Example 3 were supplied to this apparatus to flow under the same conditions.

The pressure and dew point of each gas were measured. As a result, the pressure loss when the first gas was flowing on the hollow side of the hollow fiber membranes was 17.5 kPa, the pressure loss when the second gas was flowing in the space on the outer side of the hollow fiber membranes was 0.4 kPa, and the total pressure loss was 17.9 kPa. Also, out of the water content in the first gas, the ratio of the water content permeated through the hollow fiber membranes and transferred to the second gas was 40%.

Example 4

A hollow fiber membrane element using Polyimide Hollow Fiber Membrane C (inner diameter of hollow fiber membrane: 570 μm), where the effective length (L) of the hollow fiber membrane bundle was 380 mm and the membrane filling percentage was 40%, was loaded into a cylindrical container having an inner diameter of 130 mm (D) to produce a humidifying apparatus shown in FIG. 2 (L/D=2.9).

Air at a pressure of 0.2 MPaG, a temperature of 80° C. and a relative humidity of 95% was supplied as the first gas to the hollow side of the hollow fiber membranes at a flow rate of 1,500 N liter/min, and air at a pressure of 0.2 MPaG, a temperature of 25° C. and a relative humidity of 5% was supplied as the second gas to the space on the outer side of the hollow fiber membranes at a flow rate of 1,500 N liter/min. These first and second gases were supplied to flow countercurrently.

The pressure and dew point of each gas were measured. As a result, the pressure loss when the first gas was flowing on the hollow side of the hollow fiber membranes was 5.2 kPa, the pressure loss when the second gas was flowing in the space on the outer side of the hollow fiber membranes was 0.5 kPa, and the total pressure loss was 5.7 kPa. Also, out of the water content in the first gas, the ratio of the water content permeated through the hollow fiber membranes and transferred to the second gas was 80%.

Comparative Example 4

A humidifying apparatus having substantially the same effective membrane area as in Example 4 and comprising a cylindrical container having the same inner diameter of 130 mm (D) as in Example 4 was produced by using Polyimide Hollow Fiber Membrane D (inner diameter of hollow fiber membrane: 145 μm). More specifically, a hollow fiber membrane element, where the effective length (L) of the hollow fiber membrane bundle was 90 mm and the membrane filling percentage was 40%, was loaded to produce a humidifying apparatus shown in FIG. 2 (L/D=0.7).

The same gases as in Example 4 were supplied to this apparatus to flow under the same conditions.

The pressure and dew point of each gas were measured. As a result, the pressure loss when the first gas was flowing on the hollow side of the hollow fiber membranes was 33.7 kPa, the pressure loss when the second gas was flowing in the space on the outer side of the hollow fiber membranes was 1.1 kPa, and the total pressure loss was 34.8 kPa. Also, out of the water content in the first gas, the ratio of the water content permeated through the hollow fiber membranes and transferred to the second gas was 32%.

Example 5

A hollow fiber membrane element using Polyimide Hollow Fiber Membrane E (inner diameter of hollow fiber membrane: 510 μm), where the effective length (L) of the hollow fiber membrane bundle was 280 mm and the membrane filling percentage was 40%, was loaded into a cylindrical container having an inner diameter of 100 mm (D) to produce a humidifying apparatus shown in FIG. 2 (L/D=2.8).

Air at a pressure of 0.2 MPaG, a temperature of 80° C. and a relative humidity of 95% was supplied as the first gas to the hollow side of the hollow fiber membranes at a flow rate of 500 N liter/min, and air at a pressure of 0.2 MPaG, a temperature of 25° C. and a relative humidity of 5% was supplied as the second gas to the space on the outer side of the hollow fiber membranes at a flow rate of 500 N liter/min. These first and second gases were supplied to flow countercurrently.

The pressure and dew point of each gas were measured. As a result, the pressure loss when the first gas was flowing on the hollow side of the hollow fiber membranes was 2.9 kPa, the pressure loss when the second gas was flowing in the space on the outer side of the hollow fiber membranes was 0.2 kPa, and the total pressure loss was 3.1 kPa. Also, out of the water content in the first gas, the ratio of the water content permeated through the hollow fiber membranes and transferred to the second gas was 80%.

Example 6

A hollow fiber membrane element using Polyimide Hollow Fiber Membrane F (inner diameter of hollow fiber membrane: 410 μm), where the effective length (L) of the hollow fiber membrane bundle was 230 mm and the membrane filling percentage was 40%, was loaded into a cylindrical container having an inner diameter of 100 mm (D) to produce a humidifying apparatus shown in FIG. 2 (L/D=2.3).

Air at a pressure of 0.2 MPaG, a temperature of 80° C. and a relative humidity of 95% was supplied as the first gas to the hollow side of the hollow fiber membranes at a flow rate of 500 N liter/min, and air at a pressure of 0.2 MPaG, a temperature of 25° C. and a relative humidity of 5% was supplied as the second gas to the space on the outer side of the hollow fiber membranes at a flow rate of 500 N liter/min. These first and second gases were supplied to flow countercurrently.

The pressure and dew point of each gas were measured. As a result, the pressure loss when the first gas was flowing on the hollow side of the hollow fiber membranes was 3.9 kPa, the pressure loss when the second gas was flowing in the space on the outer side of the hollow fiber membranes was 0.2 kPa, and the total pressure loss was 4.1 kPa. Also, out of the water content in the first gas, the ratio of the water content permeated through the hollow fiber membranes and transferred to the second gas was 71%.

Example 7

A hollow fiber membrane element using Polyimide Hollow Fiber Membrane E (inner diameter of hollow fiber membrane: 510 μm), where the effective length (L) of the hollow fiber membrane bundle was 340 mm and the membrane filling percentage was 40%, was loaded into a cylindrical container having an inner diameter of 130 mm (D) to produce a humidifying apparatus shown in FIG. 2 (L/D=2.6).

Air at a pressure of 0.2 MPaG, a temperature of 80° C. and a relative humidity of 95% was supplied as the first gas to the hollow side of the hollow fiber membranes at a flow rate of 1,500 N liter/min, and air at a pressure of 0.2 MPaG, a temperature of 25° C. and a relative humidity of 5% was supplied as the second gas to the space on the outer side of the hollow fiber membranes at a flow rate of 1,500 N liter/min. These first and second gases were supplied to flow countercurrently.

The pressure and dew point of each gas were measured. As a result, the pressure loss when the first gas was flowing on the hollow side of the hollow fiber membranes was 5.9 kPa, the pressure loss when the second gas was flowing in the space on the outer side of the hollow fiber membranes was 0.6 kPa, and the total pressure loss was 6.5 kPa. Also, out of the water content in the first gas, the ratio of the water content permeated through the hollow fiber membranes and transferred to the second gas was 75%.

INDUSTRIAL APPLICABILITY

According to the present invention, a humidifying apparatus which can stably perform humidification even when exposed for a long time at a temperature of about 80° C., which is an operating temperature of a fuel cell, or in an atmosphere where water vapor, oxygen, hydrogen and the like are present, can improve the humidification efficiency while lowering the pressure loss of gas even when a low-pressure gas is used, can reduce the permeation of components other than water vapor, is economical and can be suitably used for a fuel cell, is provided and this is useful in industry.

The invention claimed is:

1. A method for humidifying a supply gas of a fuel cell, comprising transferring 71% or more of the water content from a low-pressure first gas at 1 to 4 atm to a low-pressure second gas at 1 to 4 atm with the use of a humidifying apparatus fabricated by loading a hollow fiber membrane element in which a hollow fiber membrane bundle comprising a large number of hollow fiber membranes is anchored with tubesheets at both ends with the hollow fiber membranes being in the opened state, into a container having at least a supply port of a first gas, a discharge port of the first gas, a supply port of a second gas and a discharge port of the second gas, such that the space communicating with the hollow side of the hollow fiber membranes is isolated from the space communicating with the outer side of the hollow fiber membranes, wherein (a) the inner diameter of the hollow fiber membranes is from more than 500 μm to less than 1,500 μm,
(b) the water vapor permeation rate ($P'_{H2O}$) of the hollow fiber membranes is $0.5 \times 10^{-3}$ cm³ (STP)/cm²·sec·cm Hg or more,
(c) the ratio ($P'_{H2O}/P'_{O2}$) of the water vapor permeation rate to the oxygen gas permeation rate of the hollow fiber membranes is 10 or more,
(d) the elongation at tensile break of the hollow fiber membranes after hot water treatment in hot water at 100° C. for 50 hours is 80% or more of that before the hot water treatment,
(e) assuming that the effective length of the hollow fiber membrane element is L and the inner diameter of the container into which said hollow fiber membrane element is loaded is D, L/D is from 2 to 6, and
(f) the membrane filling percentage of the hollow fiber membrane bundle constituting the hollow fiber membrane element is from 35 to 55%.

2. The method for humidifying a supply gas of a fuel cell as claimed in claim 1, wherein 71% or more of the water content is transferred from a low-pressure first gas at 1 to 3 atm to a low-pressure second gas at 1 to 3 atm.

3. The method for humidifying a supply gas of a fuel cell as claimed in claim 1 or 2, wherein the first gas is an exhaust gas from the cathode of a fuel cell and the second gas is an air supplied to the cathode of the fuel cell.

4. A humidifying apparatus for fuel cells, comprising a hollow fiber membrane element in which a hollow fiber membrane bundle comprising a large number of hollow fiber membranes is anchored with tubesheets at both ends with the hollow fiber membranes being in the opened state, and a container having at least a supply port of the first gas, a discharge port of the first gas, a supply port of the second gas and a discharge port of the second gas, the hollow fiber membrane element being loaded into the container such that the space communicating with the hollow side of the hollow fiber membranes is isolated from the space communicating with the outer side of the hollow fiber membranes, wherein (a) the inner diameter of the hollow fiber membranes is from more than 500 μm to less than 1,500 μm,
(b) the water vapor permeation rate ($P'_{H2O}$) of the hollow fiber membranes is $0.5 \times 10^{-3}$ cm³ (STP)/cm²·sec·cm Hg or more,
(c) the ratio ($P'_{H2O}/P'_{O2}$) of the water vapor permeation rate to the oxygen gas permeation rate of the hollow fiber membrane is 10 or more,
(d) the elongation at tensile break of the hollow fiber membranes after hot water treatment in hot water at 100° C. for 50 hours is 80% or more of that before the hot water treatment,
(e) assuming that the effective length of the hollow fiber membrane element is L and the inner diameter of the container into which said hollow fiber membrane element is loaded is D, L/D is from 2 to 6,
(f) the membrane filling percentage of the hollow fiber membrane bundle constituting the hollow fiber membrane element is from 35 to 55%,
(g) the first gas is introduced into the hollow fiber membrane from the opening of the tubesheet at one end of the hollow fiber membrane element, the second gas is introduced through communication holes which is provided in a core tube disposed along the hollow fiber membrane bundle almost in the center part of the hollow fiber membrane bundle constituting the hollow fiber membrane element and which is provided only in the vicinity of the tubesheet on the side opposite the first gas-introducing side, and the first and second gases are allowed to countercurrently flow with intervention of the hollow fiber membranes, and
(h) 71% or more of the water content is transferred from a low-pressure first or second gas at 1 to 4 atm to a low-pressure second or first gas at 1 to 4 atm.

* * * * *